US007720585B2

(12) United States Patent
Fukuda et al.

(10) Patent No.: US 7,720,585 B2
(45) Date of Patent: May 18, 2010

(54) VARIABLE PASSENGER RESTRAINT CONTROLLED SYSTEM

(75) Inventors: Shunichi Fukuda, Atsugi (JP); Kazunori Tomimatsu, Yokohama (JP)

(73) Assignee: Nisson Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/975,073

(22) Filed: Oct. 28, 2004

(65) Prior Publication Data

US 2005/0096818 A1 May 5, 2005

(30) Foreign Application Priority Data

Oct. 29, 2003 (JP) ............ P 2003-369253
Dec. 4, 2003 (JP) ............ P 2003-405941

(51) Int. Cl.
*B60R 22/00* (2006.01)
*E05F 15/00* (2006.01)
*G05D 3/00* (2006.01)

(52) U.S. Cl. ............ 701/45; 701/46; 701/47; 701/59; 701/70; 701/301; 108/268; 108/282; 108/271; 280/806; 280/807; 280/734; 280/735; 242/390; 242/390.1; 242/390.8; 242/374; 242/534; 455/420

(58) Field of Classification Search ............ 180/268, 180/282, 271; 280/806, 807, 734, 735; 701/45, 701/301, 222, 48, 70, 79, 91, 1, 46, 47, 59; 340/457.1, 668; 455/420; 242/390, 390.1, 242/390.8, 374, 534.4
See application file for complete search history.

(56) References Cited

U.S. PATENT DOCUMENTS 5,234,071 A * 8/1993 Kajiwara ............ 180/169
5,552,986 A * 9/1996 Omura et al. ............ 701/45
5,558,370 A * 9/1996 Behr ............ 280/806
5,765,774 A * 6/1998 Maekawa et al. ............ 242/390.9

(Continued)

FOREIGN PATENT DOCUMENTS

DE 197 49 857 A1 5/1999

(Continued)

OTHER PUBLICATIONS

European Search Report issued in European Patent Application No. EP 08 00 1519, mailed May 30, 2008.

*Primary Examiner*—Khoi Tran
*Assistant Examiner*—Jorge O Peche
(74) *Attorney, Agent, or Firm*—McDermott Will & Emery LLP

(57) ABSTRACT

An aspect of the present invention provides a passenger protection device that includes, a brake pedal sensor configured to detect the amount by which a brake pedal of a vehicle is operated, a webbing, one end of the webbing fixed to the vehicle, configured to restrain a passenger seated on a seat of the vehicle, a retractor connected to the other end of the webbing, the rector configured to retract the webbing and inhibit of the webbing extraction, and an ECU electrically coupled to the brake pedal sensor, the ECU configured to detect that the brake pedal operation amount detected by the pedal sensor exceeds a first threshold value, the ECU configured to revise the threshold value based on safety related information of the vehicle to control the inhibition of the webbing extraction of the retractor.

18 Claims, 7 Drawing Sheets

U.S. PATENT DOCUMENTS

| | | | | |
|---|---|---|---|---|
| 5,788,281 | A * | 8/1998 | Yanagi et al. | 280/806 |
| 5,797,468 | A * | 8/1998 | Brister et al. | 180/292 |
| 5,845,726 | A * | 12/1998 | Kikkawa et al. | 180/178 |
| 5,913,378 | A * | 6/1999 | Brister et al. | 180/292 |
| 5,931,402 | A * | 8/1999 | Weller | 242/383.2 |
| 5,995,892 | A * | 11/1999 | Kiribayashi et al. | 701/45 |
| 6,085,137 | A * | 7/2000 | Aruga et al. | 701/51 |
| 6,213,510 | B1 * | 4/2001 | Suyama | 280/805 |
| 6,336,664 | B1 * | 1/2002 | Roder | 280/806 |
| 6,394,495 | B1 * | 5/2002 | Specht | 280/806 |
| 6,447,012 | B2 * | 9/2002 | Peter et al. | 280/806 |
| 6,473,681 | B1 * | 10/2002 | Eckert et al. | 701/70 |
| 6,530,536 | B2 * | 3/2003 | Sumiyashiki et al. | 242/383.2 |
| 6,604,597 | B2 * | 8/2003 | Fujii et al. | 180/268 |
| 6,702,326 | B1 * | 3/2004 | Fujii | 280/806 |
| 6,722,698 | B2 * | 4/2004 | Viano et al. | 280/806 |
| 6,846,019 | B2 * | 1/2005 | Tobata | 280/806 |
| 6,959,613 | B2 * | 11/2005 | Tobata | 73/862.391 |
| 7,028,802 | B2 * | 4/2006 | Tobata | 180/268 |
| 7,029,033 | B2 * | 4/2006 | Tobata | 280/807 |
| 7,100,945 | B2 * | 9/2006 | Bullinger et al. | 280/806 |
| 7,343,235 | B2 * | 3/2008 | Isaji et al. | 701/45 |
| 2001/0037271 | A1 * | 11/2001 | Kubota | 705/34 |
| 2003/0006076 | A1 * | 1/2003 | Tamor | 180/65.2 |
| 2003/0025310 | A1 * | 2/2003 | Jitsui | 280/735 |
| 2003/0114973 | A1 * | 6/2003 | Takagi et al. | 701/45 |
| 2004/0056471 | A1 * | 3/2004 | Bullinger et al. | 280/806 |
| 2004/0080204 | A1 * | 4/2004 | Enomoto et al. | 297/480 |
| 2004/0089758 | A1 * | 5/2004 | Bullinger et al. | 242/374 |
| 2005/0029865 | A1 * | 2/2005 | Kobayashi | 303/191 |
| 2005/0046584 | A1 * | 3/2005 | Breed | 340/825.72 |
| 2006/0145463 | A1 * | 7/2006 | Isaji et al. | 280/806 |
| 2006/0208169 | A1 * | 9/2006 | Breed et al. | 250/221 |
| 2007/0131468 | A1 * | 6/2007 | Bullinger et al. | 180/282 |

FOREIGN PATENT DOCUMENTS

| | | | |
|---|---|---|---|
| DE | 19749857 A1 * | 5/1999 | |
| EP | 1 415 872 A1 | 10/2003 | |
| JP | 1997187952 A2 * | 9/1997 | |
| JP | 2000-190815 A | 7/2000 | |
| JP | 2001-253317 A | 9/2001 | |

* cited by examiner

VARIABLE PASSENGER RESTRAINT CONTROLLED SYSTEM

BACKGROUND OF THE INVENTION

The present invention relates to a passenger protection device configured to retract the webbing of a seatbelt using an electric motor. More particularly the present invention relates to a technology for controlling the retraction of the webbing in accordance with the Situation.

Japanese Laid-Open Patent Publication No. 2001-253317 discloses a passenger restraining device to determine if an emergency situation exists in which there is the possibility that the vehicle in which the passenger restraining device is installed will come abnormally close to a preceding vehicle or an obstacle and, if such an emergency situation exists, to retract the seatbelt using an electric motor. The passenger restraining device uses information regarding the operation of the brakes by the driver while driving (e.g., depression of the brake pedal, brake fluid pressure) in order to determine if such an emergency situation exists.

Additionally, Japanese Laid-Open Patent Publication No. 2000-190815 discloses a technology provided with a belt control device configured to control the belt tension of a seatbelt in accordance with the driving conditions of the vehicle and belt wearer status detecting means to detect the posture of a passenger wearing a seatbelt, the belt tension control being executed based on information indicating the detected posture of the belt wearer. With that technology, when the belt wearer is the driver of the vehicle, the device controls the seatbelt tension in such a manner that the seatbelt tension increases as a quantity expressing a vehicle driving operation (e.g., brake pedal depression speed, brake pedal depression force, steering operating angle, etc.) increases, said quantity being detected and provided as vehicle state detection information.

SUMMARY OF THE INVENTION

The technologies disclosed in Japanese Laid-Open Patent Publication No. 2001-253317 and Japanese Laid-Open Patent Publication No. 2000-190815 are configured such that the motor retracts the slack in the seatbelt and restrains the passenger in the same manner whenever an emergency brake operation by the driver is detected. Thus, the surrounding circumstances are not taken into consideration.

Meanwhile, if one attempts to increase the restraining performance by merely speeding up the timing at which an emergency situation is determined to exist, the degree of passenger protection may improve but the device will be lacking from the perspective of driver comfort because it will become an annoyance.

The present invention was conceived to address these issues and its object is to provide a passenger protection device that takes the driving conditions into consideration and ensures a high restraining performance without debasing the comfort of the passenger.

An aspect of the present invention provides a passenger protection device that includes, a brake pedal sensor configured to detect the amount by which a brake pedal of a vehicle is operated, a webbing, one end of the webbing fixed to the vehicle, configured to restrain a passenger seated on a seat of the vehicle, a retractor connected to the other end of the webbing, the retractor configured to retract the webbing and inhibit of the webbing extraction, and an ECU electrically coupled to the brake pedal sensor, the ECU configured to detect that the brake pedal operation amount detected by the pedal sensor exceeds a first threshold value, the ECU configured to revise the threshold value based on safety related information of the vehicle to control the inhibition of the webbing extraction of the retractor.

DETAILED DESCRIPTION OF THE EMBODIMENTS

Figure 1:
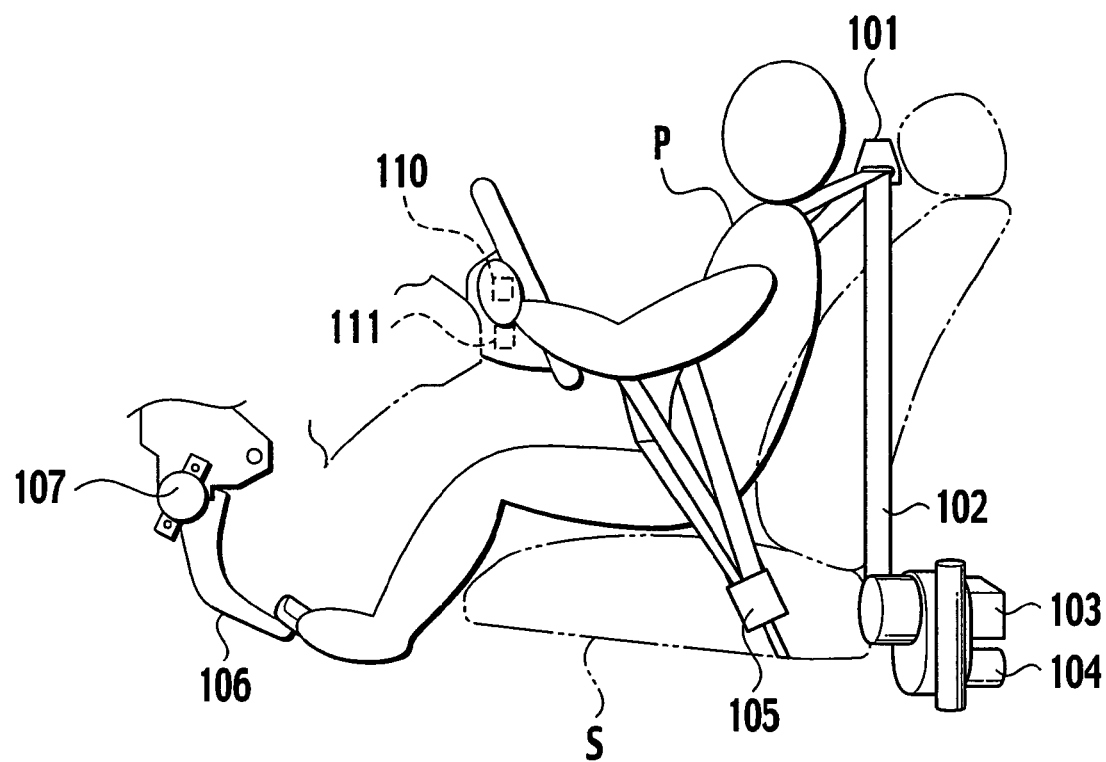
FIG. 1 is a diagrammatic view for explaining a first embodiment of a passenger protection device in accordance with the present invention.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

First Embodiment

FIG. 1 is a diagrammatic view for explaining a first embodiment of a passenger protection device in accordance with the present invention. The passenger protection device 100 is provided with a webbing 102 that serves to restrain a passenger P sitting in a seat S, and a retractor 103 configured to store the webbing 102 using an electric motor 104 configured to provided power to wind up one end of the webbing 102. The other end of the seatbelt is fastened to the vehicle body through an anchor arranged on the door side of the seat S.

The or 103 is configured to retract the webbing 102 and inhibits of extraction of the webbing 102 when the brake pedal operation amount detected by the pedal sensor 107 exceeds a threshold value prevents the webbing 102 from being extracted (drawn out) when the vehicle experiences a prescribed deceleration.

A tongue is attached in a freely movable manner to an intermediate part of the webbing 102 and is configured to engage in a detachable manner with an inner buckle 105 that is fastened to the vehicle body at a transversely-middle portion of the seat S. The webbing 102 is supported in a freely movable manner at a position between the inner buckle 105 and the retractor 103 by a shoulder anchor 101 provided on an upper portion of the center pillar.

A brake pedal 106 and a brake pedal sensor 107 configured to detect operation of the brake pedal 106 such as the depression amount and depression speed of the brake pedal 106 are provided at the feet of the passenger P. Also, a headlight switch 111 and a windshield wiper switch 110 are provided on the steering column.

Figure 2:
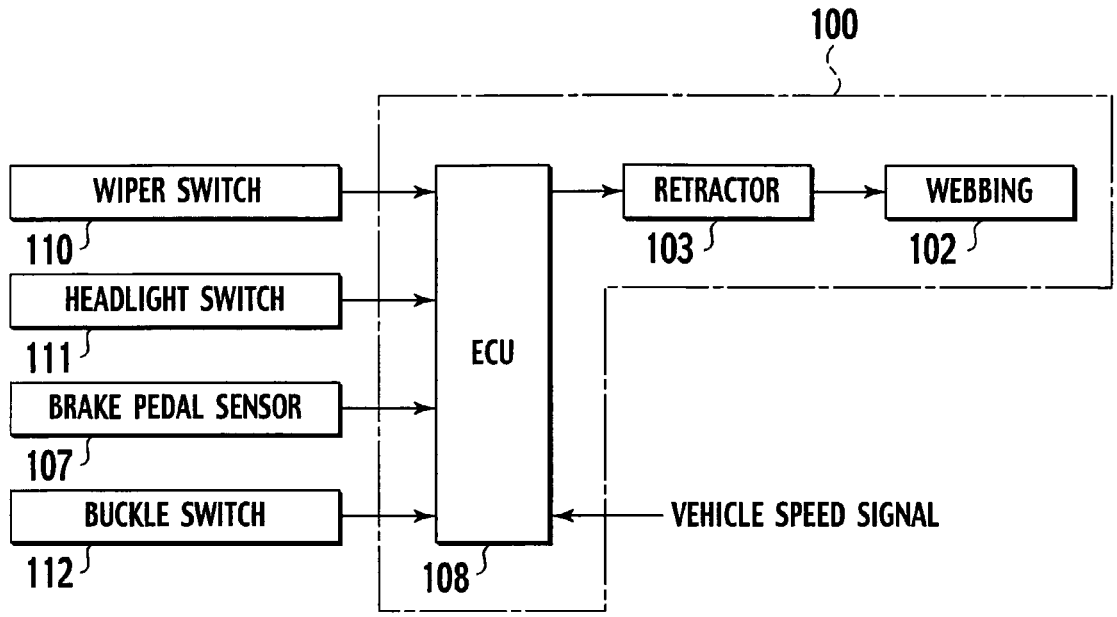
FIG. 2 is a block diagram showing a passenger protection device in accordance with the first embodiment of the present invention and peripheral devices thereof.

FIG. 2 is a block diagram showing a passenger protection device in accordance with an embodiment of the present invention and peripheral devices thereof. As shown in the figure, the passenger protection device is provided with an ECU (electronic control unit) 108 configured to control the electric motor 104 in the retractor 103 used for driving the webbing 102. The ECU 108 receives the following signals in this embodiment: a wipers ON signal obtained from the wiper switch 110, a headlights ON signal and a parking lights ON signal obtained from the headlight switch 111, a brake signal obtained from a brake pedal sensor 107, and a detection signal obtained from the buckle switch 112 (which detects if the tongue is inserted into the inner buckle 105). Also, a vehicle speed signal is obtained from a vehicle speed detecting device installed on the vehicle.

Figure 3:
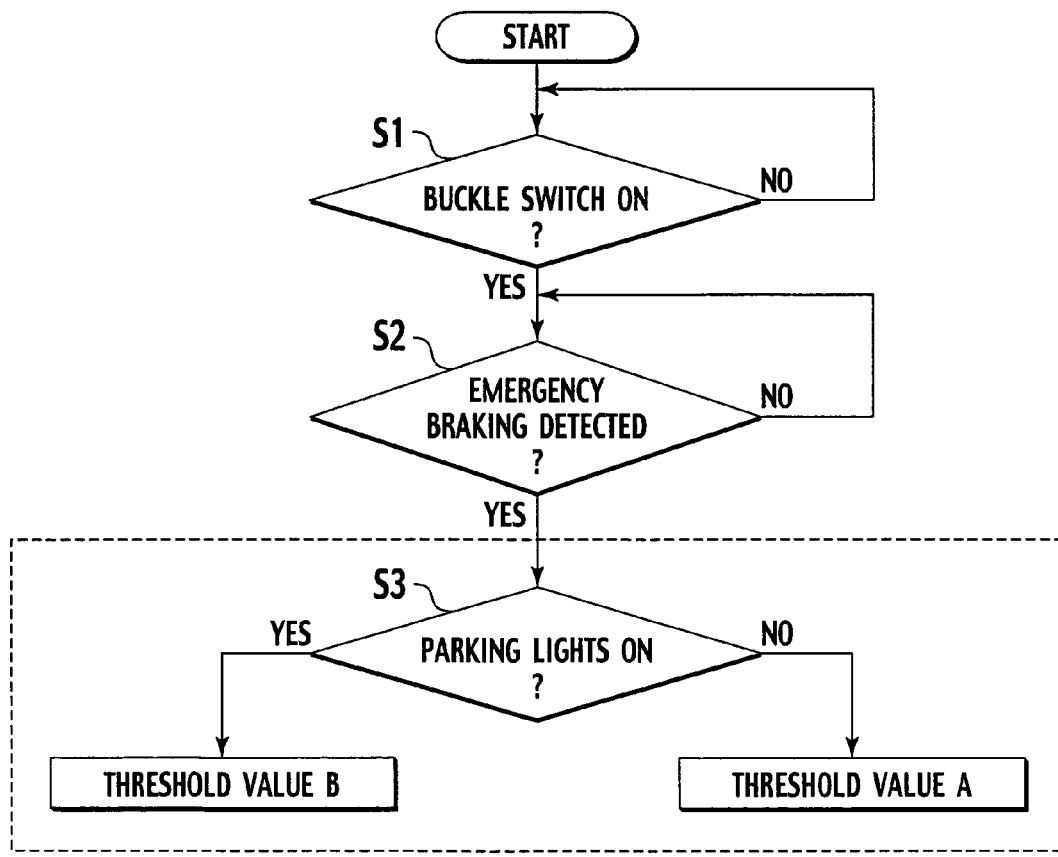
FIG. 3 is a flowchart showing the processing by which the brake operation threshold value for retracting the webbing 102 is revised in response to the parking lights ON signal obtained from the headlight switch 111 and the detection signal obtained from the buckle switch 112.

The operation of a passenger protection device 100 in accordance with the first embodiment will now be explained with reference to the flowcharts of FIGS. 3 to 6. The flowchart of FIG. 3 shows the processing by which the brake operation threshold value for retracting the webbing 102 is revised in response to the parking lights ON signal obtained from the headlight switch 111 and the detection signal obtained from the buckle switch 112. First, in step S1, the ECU 108 detects if the buckle switch 112 is on or off in order to determine if the tongue is set in the inner buckle 105. The buckle switch is on when the tongue is set therein. If the buckle switch 112 is on, the ECU 108 proceeds to step S2, where it determines if emergency braking has been detected. In this embodiment, the ECU 108 returns to step S2 if emergency braking is not detected, but the invention is not limited to such an arrangement, it is also acceptable for the ECU 108 to return to step S1 and detect the on/off state of the buckle switch 112. In step S3, the ECU 108 determines if the parking lights are on. If emergency braking is detected and the parking lights are determined to be on ("Yes" in step S3), the ECU 108 sets the brake operation threshold value (emergency braking threshold value) that serves as the condition for retracting the webbing 102 to a threshold value B. If the parking lights are not on ("No" in step S3), the ECU 108 sets the brake operation threshold value (emergency braking threshold value) that serves as the condition for retracting the webbing 102 to a threshold value A.

Figure 7:
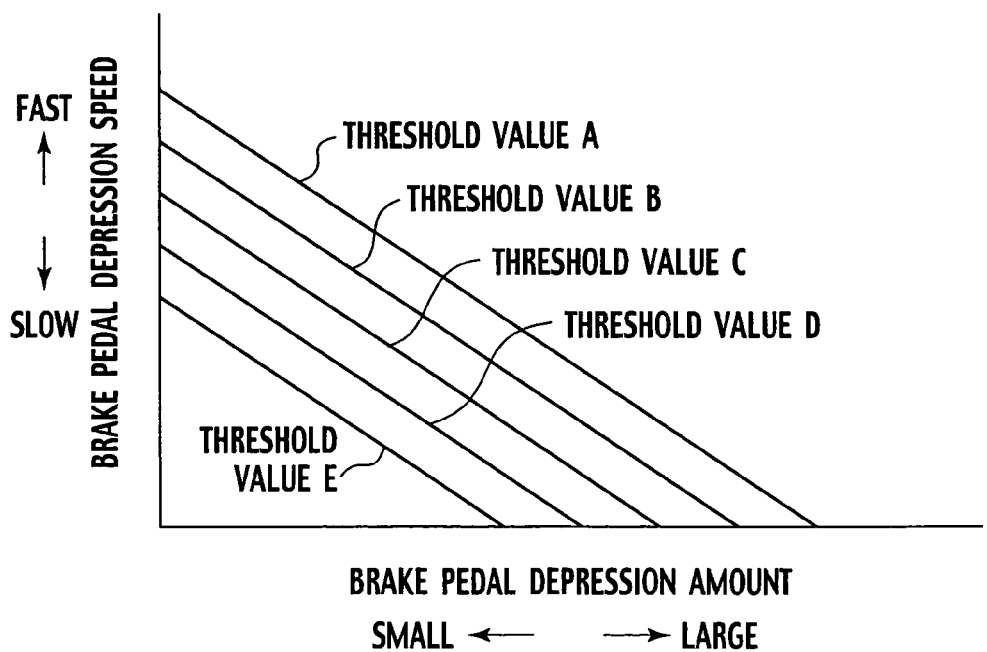
FIG. 7 is a characteristic diagram illustrating the relationship between the depression amount of the brake pedal 106, the depression speed of the brake pedal 106, and the threshold value used for retracting webbing 102.

FIG. 7 is a characteristic diagram illustrating the relationship between the depression amount of the brake pedal 106, the depression speed of the brake pedal 106, and the threshold value used for retracting webbing 102. When the threshold value B is used, the webbing 102 is retracted at a smaller brake pedal depression amount than when the threshold value A is used.

In ambient conditions under which the parking lights are turned on, ie., when the outside environment of the vehicle is dimly lighted, there is the possibility that the brakes will be operated late because the surroundings are difficult to discern. By using the threshold value B, the webbing 102 is retracted early and the passenger restraining performance can be improved.

Figure 4:
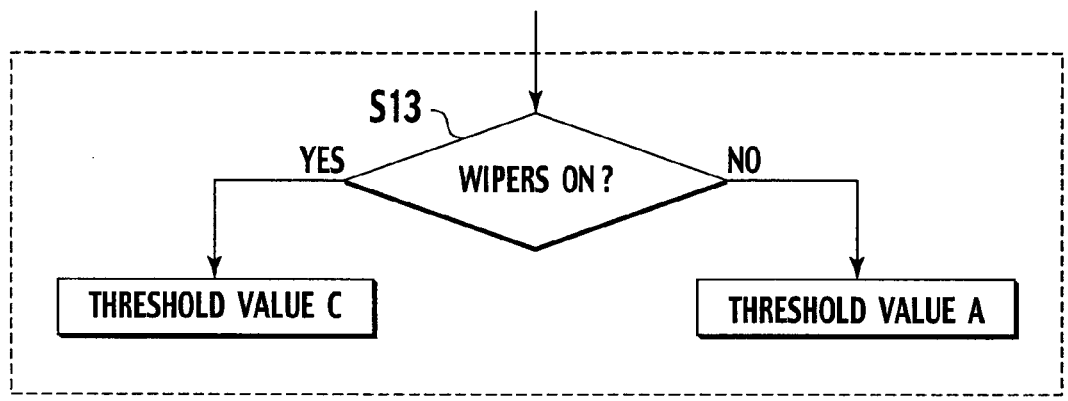
FIG. 4 is a flowchart showing the processing by which the brake operation threshold value for retracting the webbing 102 is revised in response to the wipers ON signal obtained from the wiper switch 110.

The flowchart of FIG. 4 shows the processing by which the brake operation threshold value for retracting the webbing 102 is revised in response to the wipers ON signal obtained from the wiper switch 110. The steps preceding step S13 are the same as steps S1 and S2 of FIG. 3 and are omitted from the figure.

In this embodiment, if the ECU 108 determines that the wipers are on in step S13, it sets the brake operation threshold value that serves as the condition for retracting the webbing 102 to a threshold value C. If the ECU 108 determines that the wipers are not on, it sets the brake operation threshold value that serves as the condition for retracting the webbing 102 to a threshold value A.

Thus, in ambient conditions under which the windshield wipers are turned on, ie., when it is raining or snowing, the brake operation threshold value is revised from the threshold value A to the threshold value C as shown in FIG. 7 and, as a result, the webbing 102 is retracted at a smaller depression amount of the brake pedal 106. When it is raining or snowing, there is the possibility that the brakes will be operated late because of poor visibility. By using the threshold value C, the webbing 102 is retracted early and the passenger can be restrained at a more appropriate timing.

Figure 5:
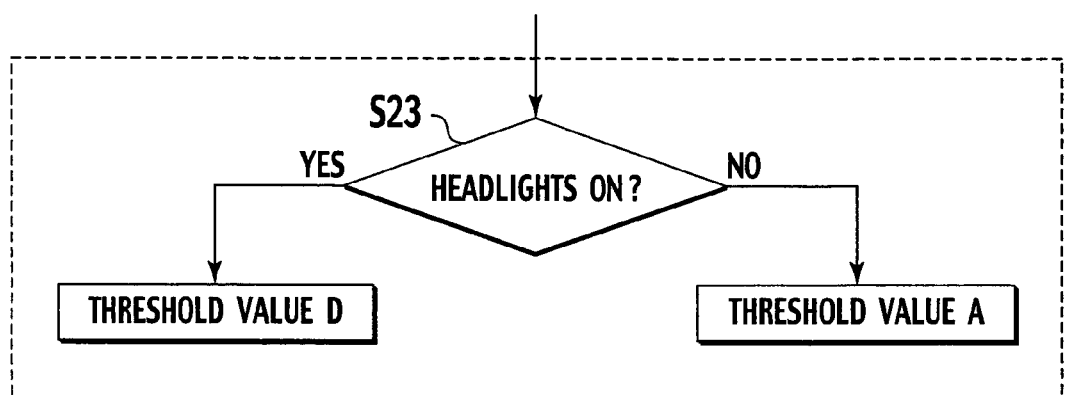
FIG. 5 is a flowchart showing the processing by which the brake operation threshold value for retracting the webbing 102 is revised in response to the headlights ON signal obtained from the headlight switch 111.

The flowchart of FIG. 5 shows the processing by which the brake operation threshold value for retracting the webbing 102 is revised in response to the headlights ON signal obtained from the headlight switch 111. The steps preceding step S23 are the same as steps S1 and S2 of FIG. 3 and are omitted from the figure.

In this example, if the ECU 108 detects that the headlights are on in step S23, it sets the brake operation threshold value that serves as the condition for reacting the webbing 102 to a threshold value D. If the ECU 108 determines that the headlights are not on, it sets the brake operation threshold value that serves as the condition for retracting the webbing 102 to the threshold value A.

Thus, in ambient conditions under which the headlights are turned on, ie., when the vehicle is traveling at night or through a tunnel the brake operation threshold value is revised from the threshold value A to the threshold value D as shown in FIG. 7 and, as a result, the webbing 102 is retracted at a smaller depression amount of the brake pedal 106. When it is dark, there is the possibility that the brakes will be operated late. By using the threshold value D, the webbing 102 is retracted early and the passenger can be restrained at a more appropriate timing.

Figure 6:
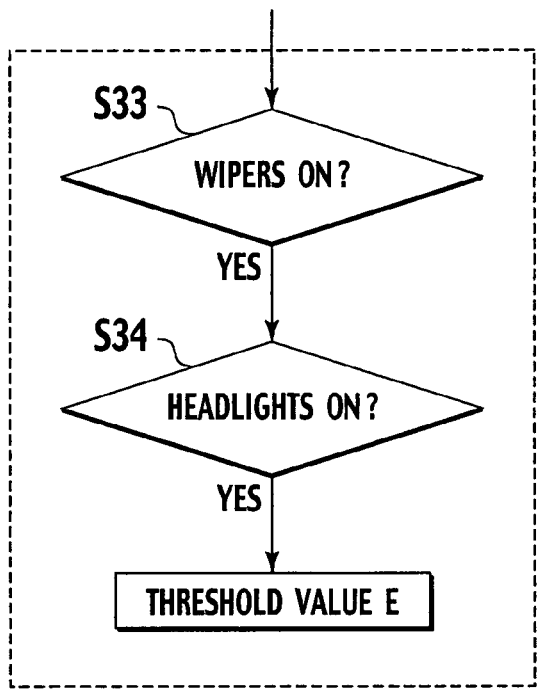
FIG. 6 is a flowchart showing the processing by which the brake operation threshold value for retracting the webbing 102 is revised in response to the wipers ON signal obtained from the wiper switch 110 and the headlights ON signal obtained from the headlight switch 111.

The flowchart of FIG. 6 shows the processing by which the brake operation threshold value for retracting the webbing 102 is revised in response to the wipers ON signal obtained from the wiper switch 110 and the headlights ON signal obtained from the headlight switch 111. The steps preceding step S33 are the same as steps S1 and S2 of FIG. 3 and are omitted from the figure.

In this example, if the ECU 108 detects the wipers are on in step S33 and the headlights are on in step S34, it sets the brake operation threshold value that serves as the condition for retracting the webbing 102 early to a threshold value E.

Thus, in ambient conditions under which both the wipers and the headlights are tuned on, e.g., when the vehicle is traveling at night in rainy weather, the brake operation threshold value set to the threshold value E as shown in FIG. 7 and, as a result, the webbing 102 is retracted at a smaller depression amount of the brake peal 106. When the surroundings are dark and visibility is poor due to rain, there is the possibility that the brakes will be operated late. By using the threshold value E, the webbing 102 is retracted early and the passenger can be restrained at a more appropriate timing.

In this way, a passenger protection device 100 in accordance with the present embodiment can revise the brake option threshold value used to the webbing 102 based on safety related information that includes, but not limited to, the on/off status of the parking lights, the windshield wipers, and the headlights. The threshold value can be set to a value well-suited to the quality of the outside visibility and the webbing 102 can be retracted based on the threshold value. Thus, the passenger can be restrained at an even more appropriate timing.

When the threshold value is revised based on two or conditions from among the on/off status of the parking lights, the on/off status of the windshield wipers, and the on/off status of the headlights, the threshold value is set to a lower value such that the webbing 102 is retracted at an even smaller depression amount of the brake pedal 106. As a result, the passenger can be restrained at an even more appropriate timing.

Meanwhile, when the padding lights, the windshield wipers, and the headlights are al off, the brake option threshold value is set to the threshold value A, which is the largest value. As a result, unnecessary retracting of the webbing 102 is avoided and the passenger protection device does not become an annoyance to the passenger. In other words, since the emergency braking threshold value is higher when the visibility is good than when the visibility is poor, the probability of the webbing being retracted for no reason is decreased and the degree of annoyance to the passenger can be reduced.

Although a passenger protection device in accordance with the present invention has been described heretofore based on an embodiment depicted in the drawings, the present invention is not limited to that embodiment. The constituent features of the various parts can be changed as desired so long as the parts have the same functions.

For example, although in the previously described embodiment all of the threshold values B, C, and D are different, the present invention is not limited to such a feature and it is also feasible for these threshold values to be the same. Furthermore, although the flowchart of FIG. 6 presents a case in which the brake operation threshold value is set to a threshold value E that is lower than the threshold values B, C, and D when it is detected that both the wipers and the headlights are on, it is also feasible to set the brake operation threshold value to a value lower than the threshold values B, C, and D when it is detected that both the wipers and the parking lights are on.

Furthermore, although in the previously described embodiment the wipers ON signal is issued from a wiper switch 110 and the headlights ON and parking lights ON signals are issued from a headlight switch 111, it is also feasible to detect the actual operation of the wipers and use the resulting detection signal as the wipers ON signal and to detect the illumination of the headlights and parking lights and use the respective resulting detection signals as headlights ON and parking lights ON signals.

When the vehicle is traveling in rainy weather, in snowy weather, at night, in a tunnel, or in some other condition under which it is more difficult to discern the surroundings of the vehicle than when the vehicle is traveling in clear weather or in the daylight hours, there is the possibility that the driver's judgment of an emergency situation will be late and thus the timing at which the driver depresses the brake pedal will be late. Thus, there is the possibility the timing at which the electric motor retracts the seatbelt will be late.

A passenger protection device in accordance with the first embodiment takes the visibility of the vehicles surroundings into consideration and makes it possible to retract the seatbelt at an appropriate timing.

Second Embodiment

Figure 8:
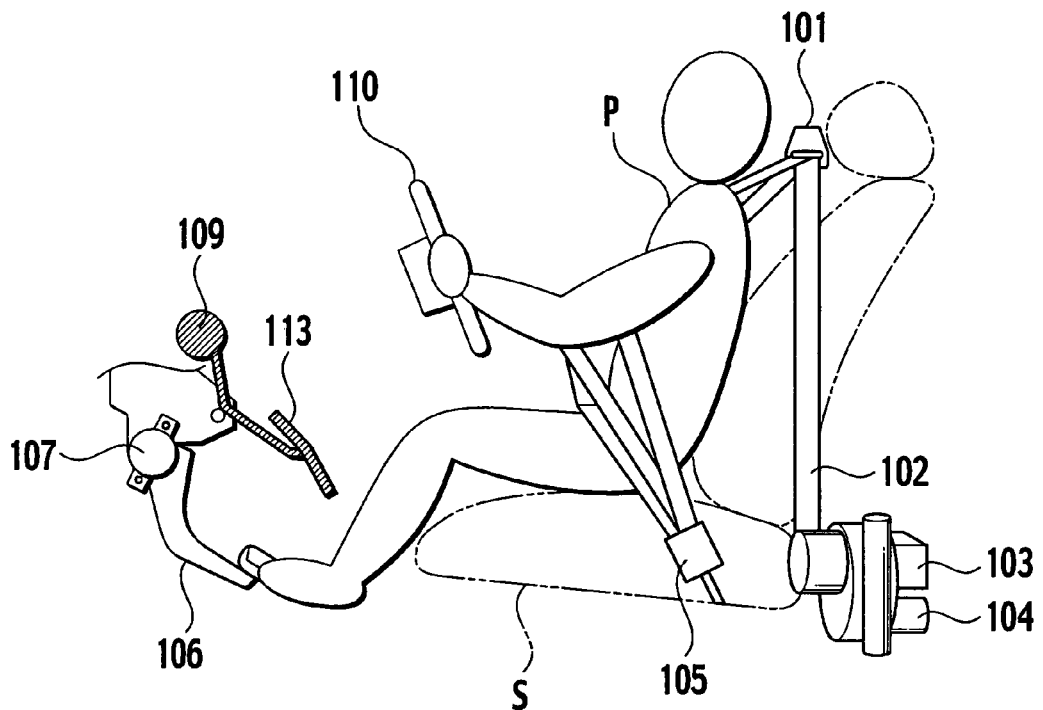
FIG. 8 is diagrammatic view for explaining a second embodiment of a passenger protection device in accordance with the present invention.

FIG. 8 is diagrammatic view for explaining a second embodiment of a passenger protection device in accordance with the present invention. Descriptions of parts that are the same as those of the first embodiment are omitted. A brake pedal 106, a brake pedal sensor 107 configured to detect the movement of the brake pedal 106, an accelerator pedal 113, and an accelerator pedal sensor 109 configured to detect the movement of the accelerator pedal 109 are provided at the feet of the passenger P. The information detected by the brake pedal sensor 107 includes the timing at which the driver starts depressing the brake pedal, the amount by which the brake pedal is depressed, the speed at which the brake pedal is depressed, and other such information related to the movement of the brake pedal 106. Meanwhile, the information detected by the accelerator pedal sensor 109 includes the amount by which the accelerator pedal is depressed, the timing at which the driver starts releasing the accelerator pedal, the speed at which the accelerator pedal is released, and other such information related to the movement of the accelerator pedal 113.

Figure 9:
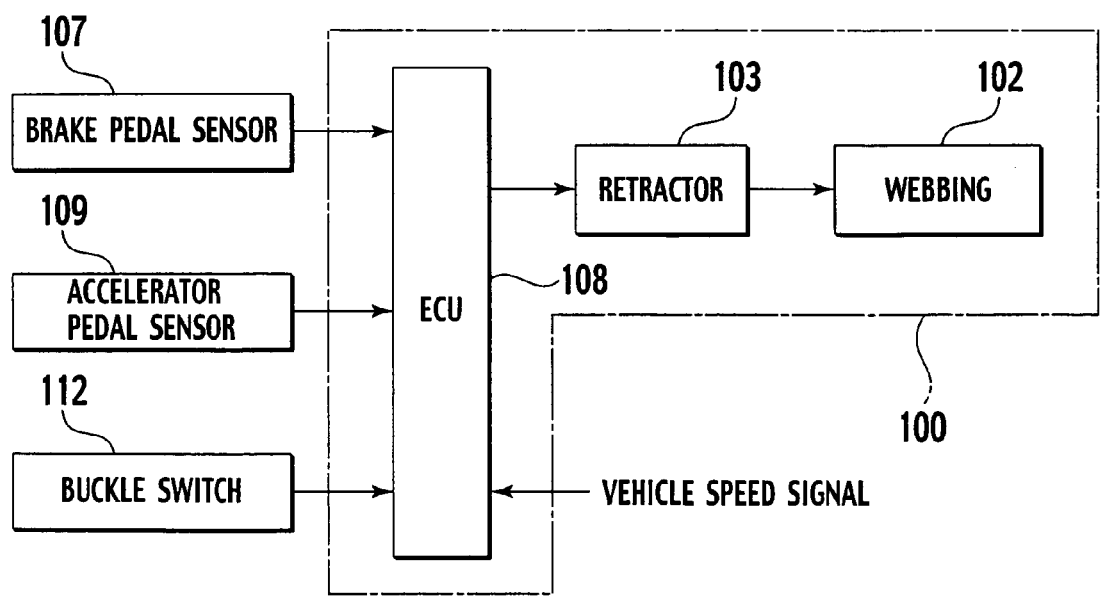
FIG. 9 is a block diagram showing a passenger protection device in accordance with the second embodiment of the present invention and peripheral devices thereof.

As shown in FIG. 9, the passenger protection device 100 of the second embodiment is provided with an ECU 108 configured to control the electric motor 104 used for driving the webbing 102. The ECU 108 is receives the following signals in this embodiment: a brake signal obtained from the brake pedal sensor 107, an accelerator signal obtained from the accelerator pedal sensor 109, and a detection signal obtained from the buckle switch 112 (which detects if the tongue is inserted into the inner buckle 105). Also, a vehicle speed signal is obtained from a vehicle speed detecting device (not shown) installed on the vehicle.

In this embodiment, when a detection value based on a vehicle driving operation (in this embodiment, the depression amount or depression speed of the brake pedal 106) exceeds a prescribed motor operation threshold value, the ECU 108 determines that an emergency brake operation has occurred and operates the electric motor 104 so as to retract the webbing 102 and restrain the passenger P.

Based on detection information from the accelerator pedal sensor 109 and the brake pedal sensor 107, the ECU 108 revises the motor operation threshold value in accordance with the timing at which the driver starts releasing the accelerator pedal 113 and the timing at which the driver starts depressing the brake pedal 106. More specifically, the shorter the pedal switch time, i.e., the shorter the difference between the timing at which the driver starts releasing the accelerator pedal 113 and the timing at which the driver stats depressing the brake pedal 106, the smaller the value to which the motor operation threshold value is revised. Based on the detection information from the accelerator pedal sensor 109, the faster the release speed of the accelerator pedal 113 is, the smaller the value to which the motor operation threshold value is revised will be. The motor operation threshold value is set as a linear function (first order polynomial) or nonlinear function (higher order polynomial) of the release speed of the accelerator pedal 113 or the pedal switch time, which is the amount of time from when the driver starts releasing the accelerator pedal 113 until the driver starts depressing the brake pedal 106.

If the pedal switch time, ie., the amount of time from when the driver starts releasing the accelerator pedal 113 until the driver starts depressing the brake pedal 106, is short or if the speed at which the accelerator pedal 113 is released is fast, it is highly probable that the depression operation of the brake pedal 8 about to occur will be an emergency brake operation. In such a case, the motor operation threshold value is set to a lower value in order to increase the sensitivity with which emergency braking is detected, thereby enabling an emergency brake operation to be detected with a smaller the depression amount of the brake pedal 106 or a slower depression speed. As a result, the electric motor 104 is operated at an earlier timing and the passenger P is restrained by the reaction of the webbing 102 at an earlier timing.

Figure 10:
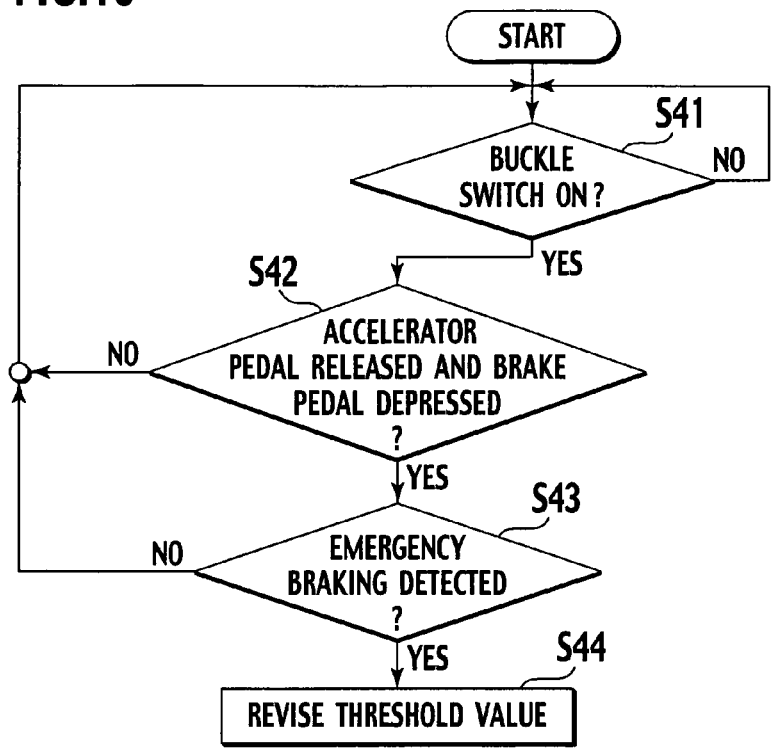
FIG. 10 is a flowchart showing a first revision processing for revising the motor operation threshold value in a passenger protection device 100 in accordance the second embodiment.

The operation of a passenger protection device 100 in accordance with the second embodiment will now be explained with reference to the flowcharts of FIGS. 10 and 11 and also to diagrams shown in FIGS. 12 and 13. The flowchart of FIG. 10 describes a first revision processing for revising the motor operation threshold value in a passenger protection device 100 in accordance the second embodiment In step S41 of FIG. 10, the ECU 108 determines if the detection signal from the buckle switch 112 is on or off in order to detect if the seatbelt is fastened, ie., if the seatbelt is being worn with the tongue inserted into the inner buckle 105. If the seatbelt is not fastened, the ECU 108 repeats step S41. If the seatbelt is fastened, the ECU 108 proceeds to step S42.

In step S42, based on the detection information from the accelerator pedal sensor 109 and the brake pedal sensor 107, the ECU 108 determines if the accelerator pedal 113 was released and the action of depressing the brake pedal 106 was started in the immediate past. If not, the ECU 108 returns to step S41. If so, the ECU 108 reads in the pedal switch time, ie., the difference between the timing at which the driver started releasing the accelerator pedal 113 and the timing at which the driver started depressing the brake pedal 106, and proceeds to step S43.

In step S43, the ECU 108 determines if the acquired pedal switch time is less than a prescribed amount of time. If the pedal switch time is equal to or larger than the prescribed amount of time, the ECU 108 determines that an emergency brake operation has not been detected and returns to step S41. If the pedal switch time is less than the prescribed amount of time, the ECU 108 determines that an emergency brake operation has been detected and proceeds to step S44.

In step S44, the ECU 108 revises the motor operation threshold value to a smaller value in such a manner that the shorter the pedal switch time (I.e., the amount of time from when the driver starts releasing the accelerator pedal 113 until the driver starts depressing the brake pedal 106) is, the earlier the timing at which the electric motor 104 is operated becomes.

Figure 11:
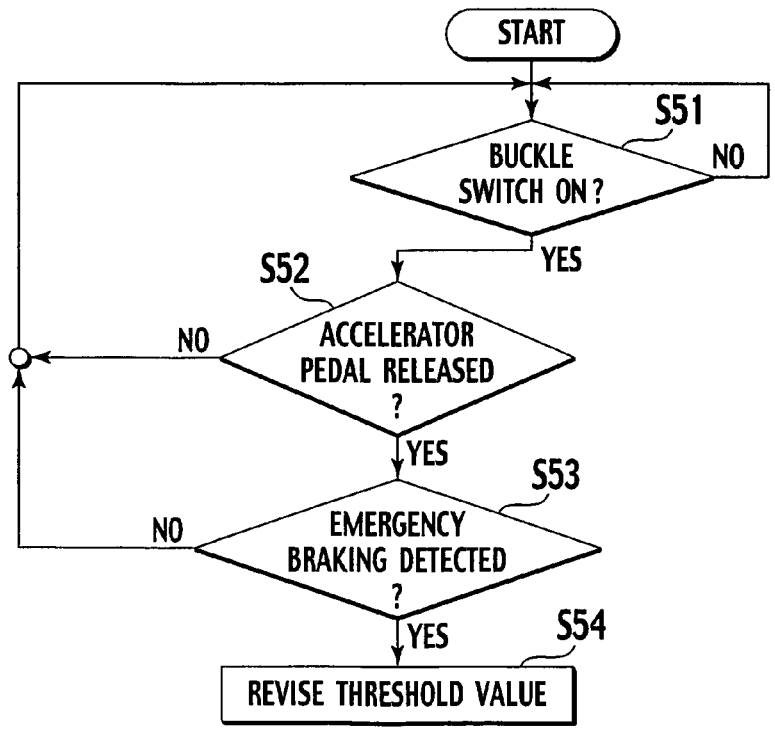
FIG. 11 is a flowchart showing a second revision processing for revising the motor operation threshold value in a passenger protection device 100 in accordance the second embodiment.

The flowchart of FIG. 11 describes a second revision processing for revising the motor operation threshold value in a passenger protection device 100 in accordance the second embodiment. In step S51 of FIG. 11, the ECU 108 determines if the buckle switch 112 is on or off (based on the detection signal thereof) in order to detect if the seatbelt is fastened, ie., if the seatbelt is being worn with the tongue inserted into the inner buckle 105. If the seatbelt is not fastened, the ECU 108 repeats step S51. If the seatbelt is fastened, the ECU 108 proceeds to step S52.

In step S52, based on the detection information from the accelerator pedal sensor 109, the ECU 108 determines if the accelerator pedal 113 was released in the immediate past. If not, the ECU 108 returns to step S51. If so, the ECU 108 reads in the release speed and release amount and proceeds to step S53.

In step S53, the ECU 108 determines if the acquired release speed and release amount of the accelerator pedal 113 are equal to or larger than prescribed values. If the release speed and release amount of the accelerator pedal 113 are less than prescribed values, the ECU 108 determines that an emergency brake operation has not been detected and returns to step S51. If the release speed and release amount of the accelerator pedal 113 are equal to or larger than prescribed values, the ECU 108 determines that an emergency brake operation has been detected and proceeds to step S54.

In step S54, the ECU 108 revises the motor operation threshold value to a smaller value in such a manner that the faster return speed of the accelerator pedal 113 is, the earlier the timing at which the electric motor 104 is operated becomes.

The method by which the motor operation threshold value is set in step S44 of FIG. 10 and step S54 in FIG. 11 will now be described in more detail with reference to FIGS. 12 and 13. FIG. 12 illustrates the first setting method in which the motor operation threshold value is set as a linear function of the pedal switch time, ie., the amount of time from when the driver starts releasing the accelerator pedal 113 until the driver starts depressing the brake pedal 106, or the release speed the accelerator pedal 113.

Figure 12:
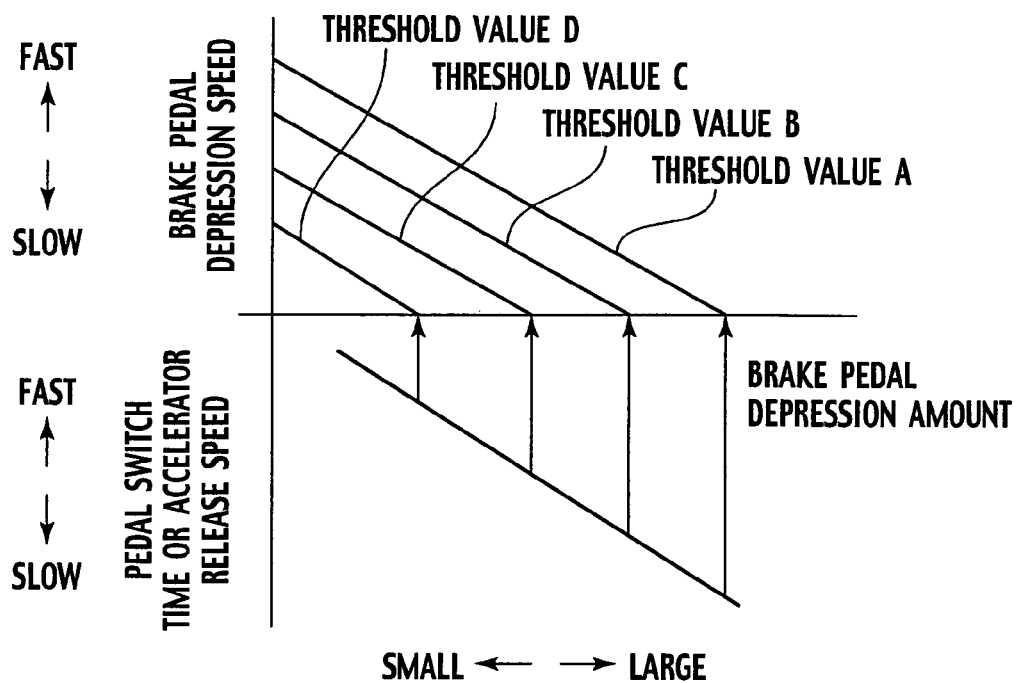
FIG. 12 illustrates the first setting method in which the motor operation threshold value is set as a linear function of the pedal switch time, ie., the amount of time from when the driver starts releasing the accelerator pedal 113 until the driver star depressing the brake pedal 106, or the release speed the accelerator pedal 113.

In the upper portion of FIG. 12, the motor operation threshold values are shown on a plot in which the vertical axis indicates the depression speed of the brake pedal 106 and the horizontal axis indicates the depression amount of the brake pedal 106. When the depression speed of the brake pedal 106 is so fast as to exceed the motor operation threshold values A, B, C, and D or when the depression amount of the brake pedal 106 is so large as to exceed the motor operation threshold values A, B, C, and D, the ECR 108 determines that an emergency brake operation has occurred and operates the electric motor 104 so that the webbing 102 is retracted and the passenger P is restrained. In short, the timing at which the webbing 102 of the seatbelt is retracted is advanced by setting the motor operation threshold value to successively lower values A, B, C, and D C (in that order) so that the electric motor 104 is operated when the brake pedal 106 is depressed at comparatively slower depression speeds or the brake pedal 106 is depressed to comparatively smaller depression amounts.

In the lower portion of FIG. 12, the motor operation threshold values are shown on a plot in which the vertical axis indicates the pedal switch time, ie., the amount of time from when the driver starts releasing the accelerator pedal 113 until the driver starts depressing the brake pedal 106, or the release speed the accelerator pedal 113 and the horizontal axis indicates the depression amount of the brake pedal 106. Here, the motor operation threshold value is set as a linear function of the vertical axis variable (ie., the pedal switch time or accelerator pedal release speed). In other words, the motor operation threshold value is set in a linear fashion with respect to the pedal switch time or the accelerator pedal release speed in such a manner that the shorter the pedal switch time or the faster the accelerator pedal 113 release speed is, the lower the motor operation threshold value is set. The revision processing executed by the ECU 108 is digital processing and the straight line shown sloping down and to the right in the lower portion of FIG. 12 would be more accurately depicted as step-like graph. However, it is possible to approach a continuous straight line by revising the motor operation threshold value in finer increments by preparing a larger number of present threshold values (A, B, C, D, E, F, etc.).

Figure 13:
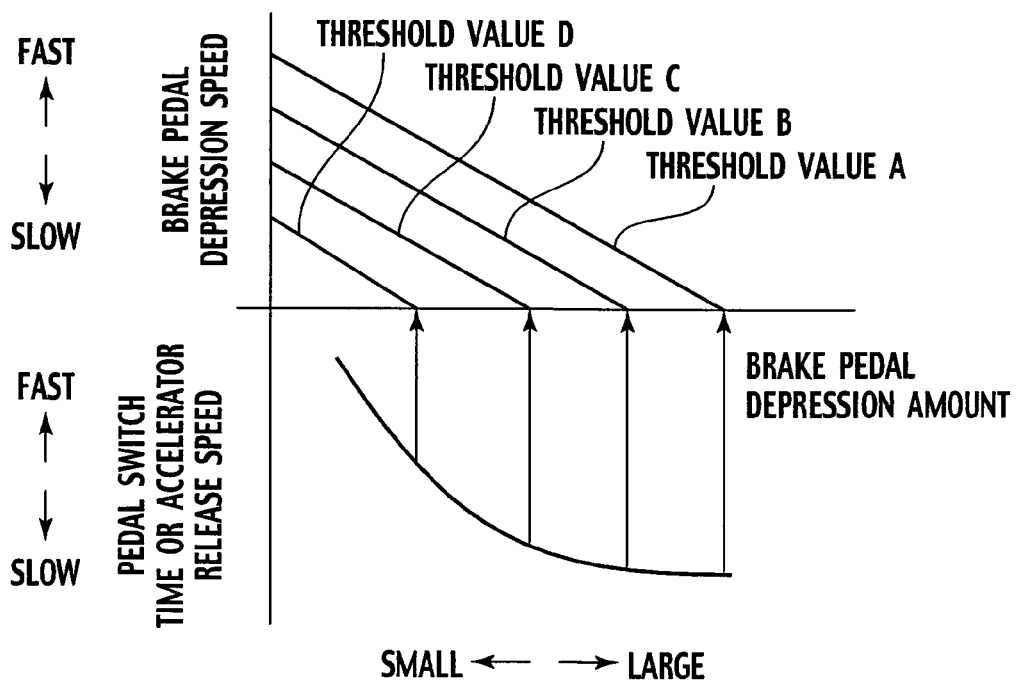
FIG. 13 illustrates the second setting method in which the motor operation threshold value is set as a higher order function of the pedal switch time, ie., the amount of time from when the driver starts releasing the accelerator pedal 113 until the driver starts depressing the brake pedal 106, or the release speed the accelerator pedal 113.

FIG. 13 illustrates the second setting method in which the motor operation threshold value is set as a higher order function of the pedal switch time, ie., the amount of time from when the driver starts releasing the accelerator pedal 113 until the driver starts depressing the brake pedal 106, or the release speed the accelerator peal 113.

The upper portion of FIG. 13 is the same as the upper portion of FIG. 12. In the lower portion of FIG. 13, the motor operation threshold values are shown on a plot in which the vertical axis indicates the pedal switch time, ie., the amount of time from when the driver starts releasing the accelerator pedal 113 until the driver starts depressing the brake pedal 106, or the release speed the accelerator pedal 113 and the horizontal axis indicates the depression amount of the brake pedal 106. Here, the motor operation threshold value is set as a higher order (curved) function of the vertical axis variable (ie., the pedal switch time or accelerator pedal release speed). In other words, the motor operation threshold value is set in a curved fashion with respect to the pedal switch time or the accelerator pedal release speed in such a manner that the motor operation threshold value becomes gradually smaller when the pedal switch time or accelerator release speed is comparatively slow and becomes smaller more rapidly when the pedal switch time or accelerator release speed is comparatively fast. The revision processing is digital processing executed by the ECU 108 and the straight line shown sloping down and to the right in the lower portion of FIG. 12 would be more accurately depicted as step-like graph. However, it is possible to approach a continuous straight line by revising the motor operation threshold value A, B, C, and D in finer increments. The revision processing executed by the ECU 108 is digital processing and the curved line shown sloping down and to the right in the lower portion of FIG. 13 would be more accurately depicted as step-like graph. However, it is possible to approach a continuous curve by revising the motor operation threshold value in finer increments by preparing a larger number of present threshold values (A, B, C, D, E, F, etc.).

Although FIG. 12 and FIG. 13 illustrate cases in which the motor operation threshold value is revised in accordance with the pedal switch time or the accelerator release speed and no explanation is given regarding taking the release amount of the accelerator pedal 113 into consideration, it is certainly possible to revise the motor operation threshold value.

As explained previously, a passenger protection device in accordance with the second embodiment is a passenger protection device configured to operate an electric motor 104 so as to retract the webbing 102 of a seatbelt and restrain a passenger when a detection value based on safety related information exceeds a motor operation threshold value, said safety related information including such vehicle driving operations as operation of the accelerator pedal and brake pedal. Based on detection information from an accelerator pedal sensor 109 and a brake pedal sensor 107, an ECU (controller) 108 revises the motor operation threshold value in accordance with the timing at which the driver starts releasing the accelerator pedal 113 and the timing at which the driver starts depressing the brake pedal 106. By combining information from the accelerator pedal 113 and information from the brake pedal 106, emergency braking can be detected earlier and more accurately in accordance with the driving conditions and the timing at which the webbing 102 of the seatbelt is retracted can be advanced by revising the motor operation threshold value to a lower value. As a result, the forward movement experienced by the passenger in a collision can be reduced.

In a passenger protection device in accordance with the second embodiment, the ECU 108 uses detection information from the accelerator pedal sensor 109 and the brake pedal sensor 107 to revise the motor operation threshold value in such a manner that the shorter the pedal switch time, ie., the shorter the difference between the timing at which the driver starts releasing the accelerator pedal 113 and the timing at which the driver starts depressing the brake pedal 106, the smaller the value to which the motor operation threshold value is revised; or the ECU 108 uses detection information from the accelerator pedal sensor 109 to revise the motor operation threshold value in such a manner that the faster the speed at which the acceleration pedal 113 is released, the smaller the value to which the motor operation threshold value is revised. Thus, unlike technologies that attempt to increase the passenger restraining performance by merely speeding up the timing at which an emergency situation is determined to exist, this embodiment increases the sensitivity with which emergency braking is detected and advances the timing at which the webbing is retracted only when it is highly probable that an emergency brake operation will occur. As a result, a high degree of passenger protection is achieved while also reducing the annoyance associated with emergency braking so that degradation of the passenger's comfort is avoided.

Furthermore, in a passenger protection device in accordance with the second embodiment, the motor operation threshold value is set as a linear function or higher order function of the release speed of the accelerator pedal 113 or the pedal switch time, which is the amount of time from when the driver starts releasing the accelerator -pedal 113 until the driver starts depressing the brake pedal 106. Thus, the function used to revise the motor pedal threshold value can be changed in accordance with the road conditions and driving conditions and emergency braking can be detected earlier and more accurately in accordance with the driving conditions.

Although in the second embodiment the ECU 108 uses the depression amount and depression speed of the brake pedal 106 as the aforementioned detection values based on vehicle driving operations for determining if the passenger should be restrained by operating the motor 104 and retracting the webbing 102, the invention is not limited to such an approach. It is also acceptable to use detection information from the accelerator pedal sensor 109, information regarding the steering angle of the steering wheel 10, the vehicle speed, a combination of these, or a combination of one or more of these including the detection information from the brake pedal sensor 107.

In a passenger protection device in accordance with the second embodiment, detection information from the accelerator pedal sensor and the brake pedal are used to revise the motor operation threshold value in accordance with the timing at which the driver starts releasing the accelerator pedal 113 and the timing at which the driver starts depressing the brake pedal 106. Thus, by using a combination of information from the accelerator pedal and information from the brake pedal, the second embodiment can detect emergency braking earlier and more accurately in accordance with the driving conditions and the timing at which the webbing of the seatbelt is retracted can be advanced by revising the motor operation threshold value to a lower value. As a result, the forward movement experienced by the passenger in a collision can be reduced. Additionally, unlike technologies that attempt to increase the passenger restraining performance by merely speeding up the timing at which an emergency situation is determined to exist, the second embodiment increases the sensitivity with which emergency braking is detected and advances the timing at which the webbing is retraced only when it is highly probable that an emergency brake operation will occur. As a result a high degree of passenger protection is achieved while also reducing the annoyance associated with emergency braking so that degradation of the passenger's comfort is avoided.

The entire contents of Japanese patent applications P2003-369253 filed Oct. 29, 2003, P2003-405941 filed Dec. 4, 2003, are hereby incorporated by reference.

The invention may be embodied in other specific forms without departing from the spirit or essential characteristics thereof. The present embodiment is therefore to be considered in all resects as illustrative and not restrictive, the scope of the invention being indicated by the appended claims rather than by the foregoing description, and all changes which come within the meaning and range of equivalency of the claims are therefore intended to be embraced therein.

What is claimed is:

1. A passenger protection device, comprising:
   a brake pedal sensor configured to detect an amount by which a brake pedal of a vehicle is operated, a timing at which a driver starts depressing the brake pedal and a speed at which the brake pedal is operated;
   an accelerator pedal sensor configured to detect an amount by which an accelerator pedal of the vehicle is depressed, a timing at which the driver starts releasing the accelerator pedal and a speed at which the accelerator pedal is released;
   a webbing, one end of the webbing fixed to the vehicle, configured to restrain a passenger seated on a seat of the vehicle;
   a retractor connected to a second end of the webbing, the retractor configured to retract the webbing and inhibit webbing extraction; and
   an electronic control unit (ECU) electrically coupled to the brake pedal sensor, the ECU configured to detect the brake pedal operation amount and the brake pedal operation speed detected by the brake pedal sensor, and the accelerator pedal amount and accelerator pedal speed detected by the accelerator pedal sensor, whereby a plurality of motor operation threshold values are determined in accordance with a pedal switch time, the ECU configured to determine the pedal switch time in accordance to the timing at which the driver starts releasing the accelerator pedal and the timing at which the driver starts depressing the brake pedal, the ECU configured to determine an emergency brake operation if the pedal switch time is less than a prescribed amount of time, wherein the ECU changes a first motor operation threshold value to a second motor operation threshold value in which the webbing is retracted at a smaller brake operation amount than the first threshold value, which increases sensitivity of inhibition of extraction of the webbing, thereby enabling an emergency brake operation to be detected with a smaller depression amount of the brake pedal,
   wherein the brake pedal operation amount is obtained based on brake pedal traveling distance detected by the brake pedal sensor, and the brake pedal operation speed is obtained based on brake pedal traveling speed detected by the brake pedal sensor, and
   wherein the ECU is configured to determine an emergency brake operation and operate the retractor or webbing when at least the brake pedal amount exceeds the first motor operation threshold value and the brake pedal speed exceeds the first motor operation threshold value.

2. The passenger protection device as claimed in claim 1, wherein:
   the ECU is configured to revise the threshold value based on information of operation of the vehicle by the passenger,
   the accelerator pedal sensor is configured to detect the speed at which the accelerator pedal is released; and the ECU is configured to revise the threshold value based on the accelerator pedal release speed detected by the accelerator pedal sensor, and
   the ECU is configured to revise the threshold value in such a manner that the faster the accelerator pedal release speed detected by the accelerator pedal sensor is, the lower the threshold value will become.

3. The passenger protection device as claimed in claim 1, wherein:
   the ECU is configured to revise the threshold value based on safety related information regarding visibility of the surroundings of the vehicle.

4. The passenger protection device as claimed in claim 3, wherein:
   the ECU is configured to lower the threshold value to expedite the inhibition of webbing extraction when declined visibility of the surroundings of the vehicle is detected.

5. The passenger protection device of claim 4, further comprising:
   a wiper switch configured to switch the windshield wipers of the vehicle on and off,
   wherein the ECU is configured to lower the threshold value to expedite the inhibition of webbing extortion when the passenger's operation of the wiper switch is detected.

6. The passenger protection device of claim 4, further comprising:
   a headlight switch configured to switch the parking lights or headlights of the vehicle on and off, wherein
   the ECU is configured to lower the threshold value to expedite the inhibition of webbing extraction when the passenger's operation of the headlight switch is detected.

7. The passenger protection device of claim 4, further comprising:
   a headlight switch configured to switch the parking lights or headlights of the vehicle on and off, and
   a wiper switch configured to switch the windshield wipers of the vehicle on and off, wherein the ECU is configured to revise the threshold value to a second threshold value that is smaller than the first threshold value when the status of the headlight switch indicates that the parking lights or headlights are on or the status of the wiper switch indicates that the windshield wipers are on, the ECU configured to revise the threshold value to a third threshold value that is smaller than the second threshold value when the status of the headlight switch indicates that the parking lights or headlights are on and the status of the wiper switch indicates that the windshield wipers are on.

8. The passenger protection device of claim 1, wherein the ECU is configured to expedite the inhibition of webbing extraction based on the timing of a release operation of the accelerator pedal detected by an accelerator pedal sensor and a timing of a depression operation of the brake pedal detected by the brake pedal sensor.

9. The passenger protection device of claim 8, wherein the accelerator pedal sensor is configured to detect the speed at which the accelerator pedal is released; and the ECU is configured to revise the threshold value based the accelerator pedal release speed detected by the accelerator pedal sensor.

10. The passenger protection device of claim 9, wherein the ECU is configured to revise the threshold value in such a manner that the faster the accelerator pedal release speed detected by the accelerator pedal sensor is, the lower the threshold value will become.

11. The passenger protection device of claim 1, wherein the ECU is configured to lower the threshold value and expedite the inhibition of webbing extraction when it determines that a time interval between a timing of a release operation of the accelerator pedal detected by the accelerator pedal sensor and a timing of a depression operation of the brake pedal detected by the brake pedal sensor is equal to or less than a prescribed time interval.

12. The passenger protection device of claim 11, wherein the ECU is configured to lower the threshold value in such a manner that the shorter the time interval between the timing of a release operation of the accelerator pedal detected by the accelerator pedal sensor and the timing of a depression operation of the brake pedal detected by the brake pedal sensor is, the earlier extraction of the webbing is inhibited.

13. The passenger protection device of claim 11, wherein the ECU is configured such that in order to determine the threshold value, it calculates the threshold value based on a higher order function of the time interval between the timing of a release operation of the accelerator pedal detected by the accelerator pedal sensor and the timing of a depression operation of the brake pedal detected by the brake pedal sensor.

14. The passenger protection device of claim 11, wherein the ECU is configured such that in order to determine the threshold value, it calculates the threshold value based on a linear function of the time interval between the timing of a release operation of the accelerator pedal detected by the accelerator pedal sensor and the timing of a depression operation of the brake pedal detected by the brake pedal sensor.

15. The passenger protection device of claim 1, wherein the brake pedal sensor is configured to detect the amount by which the brake pedal is depressed.

16. The passenger protection device of claim 1, wherein the retractor comprises an electric motor configured to provide mechanical power for winding the other end of the webbing, and
the ECU is configured to control the retracting operation by controlling the mechanical power delivered by the electric motor.

17. The passenger protection device of claim 1, wherein the brake pedal sensor is configured to detect the speed at which the brake pedal is depressed.

18. A passenger protection device, comprising:
a brake pedal sensor means for detecting an amount by which a brake pedal of a vehicle is operated, a timing at which a driver starts depressing the brake pedal and a speed at which the brake pedal is operated;
an accelerator pedal sensor means for detecting an amount by which an accelerator pedal of the vehicle is depressed, a timing at which the driver starts releasing the accelerator pedal and a speed at which the accelerator pedal is released;
a webbing means, one end of the webbing fixed to the vehicle, for restraining a passenger seated on a seat of the vehicle;
a retractor connected to a second end of the webbing, the retractor means for retracting the webbing and inhibiting webbing extraction, and
an electronic control unit means (ECU) electrically coupled to the brake pedal sensor, the ECU configured to detect the brake pedal operation amount and the brake pedal operation speed detected by the brake pedal, and the accelerator pedal amount and accelerator pedal speed detected by the accelerator pedal sensor, whereby a plurality of motor operation threshold values are determined in accordance with a pedal switch time, the ECU configured to determine the pedal switch time in accordance to the timing at which the driver starts releasing the accelerator pedal and the timing at which the driver starts depressing the brake pedal, the ECU configured to determine an emergency brake operation if the pedal switch time is less than a prescribed amount of time, wherein the ECU means changes a first motor operation threshold value to a second motor operation threshold value in which the webbing is retracted at a smaller brake operation amount than the first threshold value, which increases sensitivity of inhibition of extraction of the webbing, thereby enabling an emergency brake operation to be detected with a smaller depression amount of the brake pedal,
wherein the brake pedal operation amount is obtained based on brake pedal traveling distance detected by the brake pedal sensor, and the brake pedal operation speed is obtained based on brake pedal traveling speed detected by the brake pedal sensor, and
wherein the ECU is configured to determine an emergency brake operation and operate the retractor or webbing when at least the brake pedal amount exceeds the first motor operation threshold value and the brake pedal speed exceeds the first motor operation threshold value.

* * * * *